(12) United States Patent
El Dokor et al.

(10) Patent No.: US 12,236,643 B1
(45) Date of Patent: Feb. 25, 2025

(54) LOCALIZATION OF LENS FOCUS PARAMETER ESTIMATION AND SUBSEQUENT CAMERA CALIBRATION

(71) Applicant: Edge 3 Technologies, Inc., Phoenix, AZ (US)

(72) Inventors: Tarek El Dokor, Phoenix, AZ (US); Jordan Cluster, Tempe, AZ (US)

(73) Assignee: Edge 3 Technologies, Phoenix, AZ (US)

( * ) Notice: Subject to any disclaimer, the term of this patent is extended or adjusted under 35 U.S.C. 154(b) by 0 days.

(21) Appl. No.: 18/525,694

(22) Filed: Nov. 30, 2023

Related U.S. Application Data

(63) Continuation of application No. 17/843,996, filed on Jun. 18, 2022, now Pat. No. 11,875,536, which is a continuation of application No. 17/005,224, filed on Aug. 27, 2020, now Pat. No. 11,367,220.

(51) Int. Cl.
| | |
|---|---|
| *G06K 9/00* | (2022.01) |
| *G06T 7/00* | (2017.01) |
| *G06T 7/80* | (2017.01) |
| *H04N 23/90* | (2023.01) |

(52) U.S. Cl.
CPC ............ *G06T 7/85* (2017.01); *G06T 7/0006* (2013.01); *H04N 23/90* (2023.01); *G06T 2200/21* (2013.01); *G06T 2207/10148* (2013.01); *G06T 2207/20212* (2013.01); *G06T 2207/30108* (2013.01)

(58) Field of Classification Search
CPC ..... G06T 7/85; G06T 7/0006; G06T 2200/21; G06T 2207/10148; G06T 2207/20212; G06T 2207/30108; H04N 23/90
See application file for complete search history.

(56) References Cited

U.S. PATENT DOCUMENTS

| | | | | |
|---|---|---|---|---|
| 6,870,563 | B1 * | 3/2005 | Kang ............ | H04N 5/2628 348/222.1 |
| 7,852,369 | B2 * | 12/2010 | Cutler ............ | H04N 23/58 348/14.09 |
| 10,757,390 | B2 * | 8/2020 | Boisson ......... | H04N 13/246 |
| 2002/0141659 | A1 * | 10/2002 | Florin ............ | G06T 15/205 382/285 |
| 2003/0004694 | A1 * | 1/2003 | Aliaga ........... | G06T 5/80 703/2 |
| 2005/0068452 | A1 * | 3/2005 | Steinberg ...... | H04N 23/663 348/335 |
| 2005/0168616 | A1 * | 8/2005 | Rastegar ........ | H04N 23/58 348/335 |
| 2011/0080487 | A1 * | 4/2011 | Venkataraman | G02B 5/20 348/E5.024 |

(Continued)

FOREIGN PATENT DOCUMENTS

| | | | | | |
|---|---|---|---|---|---|
| CN | 109166154 A | * | 1/2019 | ........... | G06T 7/85 |
| CN | 105939442 B | * | 8/2019 | ........... | G03B 41/00 |

*Primary Examiner* — Shervin K Nakhjavan
(74) *Attorney, Agent, or Firm* — Gordon Kessler

(57) ABSTRACT

A method and system for calibrating a lens. The method includes defining a plurality of omni-symmetrical regions within the lens, determining one or more localized lens parameters associated with each of the plurality of omni-symmetrical regions, and defining a localized set of calibration parameters for each of the plurality of omni-symmetrical region. The localized set of calibration parameters may then be employed in a computational image application.

17 Claims, 10 Drawing Sheets

(56) References Cited

U.S. PATENT DOCUMENTS

| | | | |
|---|---|---|---|
| 2013/0208083 A1* | 8/2013 | Li | H04N 13/207 |
| | | | 348/E7.001 |
| 2014/0146132 A1* | 5/2014 | Bagnato | H04N 23/45 |
| | | | 348/36 |
| 2016/0080637 A1* | 3/2016 | Tasaki | H04N 17/002 |
| | | | 348/36 |
| 2017/0277018 A1* | 9/2017 | Dayana | H04N 23/959 |
| 2017/0366804 A1* | 12/2017 | Du | H04N 13/296 |
| 2018/0300900 A1* | 10/2018 | Wakai | G06T 7/85 |
| 2018/0344145 A1* | 12/2018 | Kozub | A61B 1/00194 |
| 2019/0373167 A1* | 12/2019 | Liu | H04N 23/63 |
| 2019/0387212 A1* | 12/2019 | Oh | G06T 7/80 |
| 2020/0041378 A1* | 2/2020 | Drew | G01M 11/0235 |
| 2020/0366814 A1* | 11/2020 | Dan | H04N 25/40 |
| 2021/0118177 A1* | 4/2021 | Palmer | G06T 7/571 |
| 2021/0243422 A1* | 8/2021 | Hayasaka | H04N 23/67 |
| 2021/0294071 A1* | 9/2021 | Vinogradov | G02B 7/023 |
| 2022/0128412 A1* | 4/2022 | Mart?nez Corral | G02B 30/10 |
| 2022/0148223 A1* | 5/2022 | Geissler | G06T 5/80 |

\* cited by examiner

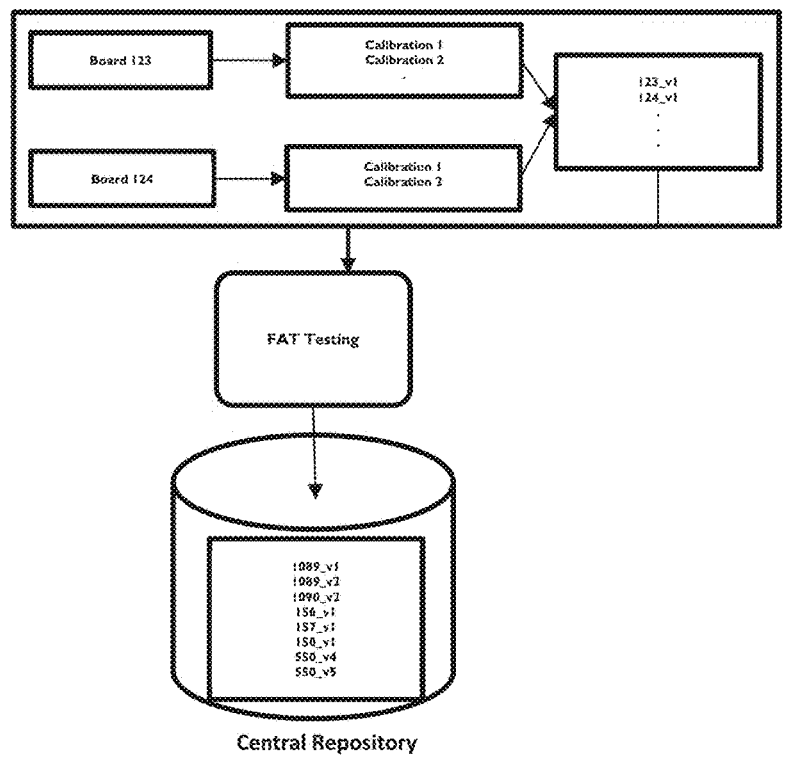
Figure 12
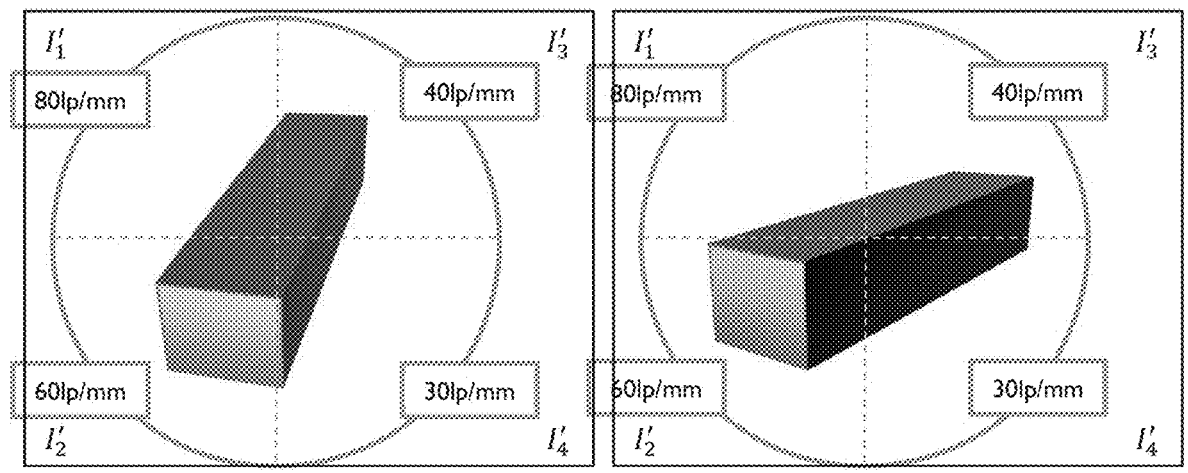
Figure 13A Figure 13B

LOCALIZATION OF LENS FOCUS PARAMETER ESTIMATION AND SUBSEQUENT CAMERA CALIBRATION

CROSS REFERENCE TO RELATED APPLICATIONS

This application is a continuation of U.S. patent application Ser. No. 17/843,996 filed Jun. 18, 2022 to El Dokor et al., titled "Localization of lens focus parameter estimation and subsequent camera", currently pending, which is a continuation of U.S. patent application Ser. No. 17/005,224 filed Aug. 27, 2020 to El Dokor et al., titled "Localization of lens focus parameter estimation and subsequent camera", now U.S. Pat. No. 11,367,220 the contents thereof being incorporated herein by reference.

BACKGROUND

In imaging and photogrammetric applications, having a focused camera is critical for good image quality and reliable image analysis. Camera manufacturers often try to improve on lens image quality and the associated lens manufacturing process to improve the measurement resolution that is associated with a given camera. Manufacturers also try to improve the overall image quality in general by adding more pixels, mitigating signal to noise ratio among many other relevant measures. Ultimately, cameras need a well-focused image for measurement applications. Manufacturing computational cameras with high yields and almost no defects is a process that requires a comprehensive assembly line that can address the many pitfalls associated with creating a high-quality camera.

SUMMARY

Components of a Typical Camera Module

To best understand the challenge, a description of the different components that are associated with a modern camera will be provided. Mobile cameras in mass production today are mainly comprised of a PCB board, an image sensor and a camera lens. The PCB board may be used for the image processing pipeline as well as for communication with other parts of the phone or other compute device. The image sensor is typically sourced from a supplier, is a CMOS image sensor, and may have one or more components. The lens component of the camera is typically comprised of more than one physical lens. The combination of lenses is set to a given spec that is associated with the camera module or the OEM's camera requirements. FIG. 1 depicts one example of a camera module in a cell phone 105 in which the PCB board 110, image sensor 120 and camera lens 130 are depicted. Other examples of camera modules, such as the one depicted in FIG. 2 may contain multiple PCBs 210 as well as an onboard vision processor 240 in addition to the other elements for more advanced compute. FIG. 2 shows a lens 230, an image sensor 220, and multi-layer PCB 210 in which there are two modules: 1) an interface module 212 and 2) an onboard PCB 214. The image sensor may perform the following sensor functions: 1. Photoelectric conversion (converts photos into electrons); 2. charge accumulation (collect a generated charge as a signal charge); 3. transfer the signal (move the signal charge to the detecting node); 4. signal detection (convert the signal charge into an electoral voltage signal); and 5. analog to digital conversion (converting the voltage into a digital value).

This disclosure is also operable on systems that include multiple cameras as the system and method operate on each camera individually. Thus, the disclosure is also applicable to multi-camera modules and multi-view camera manufacturing.

BRIEF DESCRIPTION OF THE DRAWINGS

The invention will be described making reference to the drawings, in which:

FIG. 12 depicts a camera calibration repository;

FIG. 13A depicts an object to be dimensioned in a camera field of view from a first point of view; and FIG. 13B depicts an object to be dimensioned in a camera field of view from second point of view.

DESCRIPTION

Figure 1:
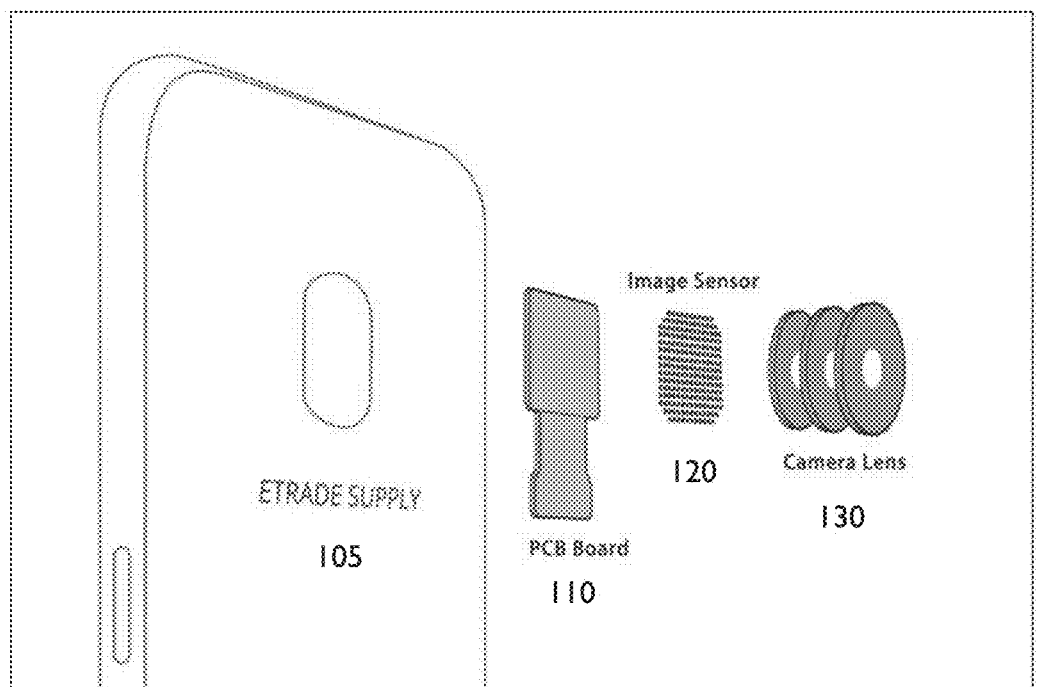
FIG. 1 is a diagram depicting components associated with a typical camera module of a cellphone.
Figure 2:
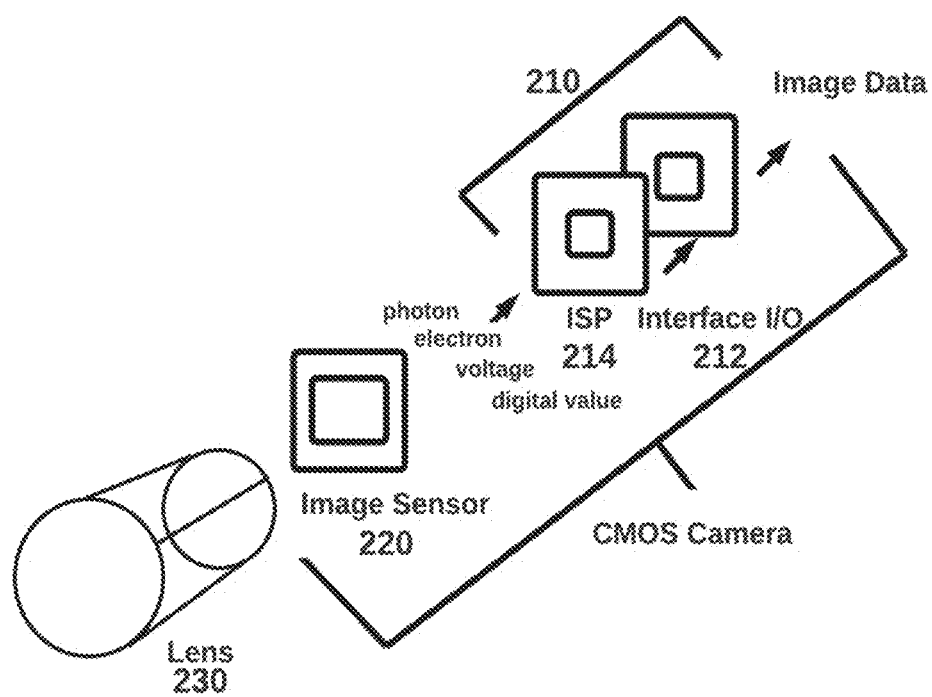
FIG. 2 is a diagram depicting a breakout of the construction of an exemplary camera module.

In accordance with various embodiments of the invention, the term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit) or any other SoC such as Qualcomm's Snapdraggon processor, or even a specialized vision SoC or vision IP component found in a bigger SoC. The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any subject matter described in this disclosure or on the scope of what may be claimed, but rather as descriptions of features that may be specific to particular embodiments of the subject matter described in this disclosure. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

System-Level Camera Modeling

In accordance with the present disclosure, in order to understand how to build accurate computational cameras, it is important to understand cameras from a system-level perspective in order to best address the issue of better camera/image quality. The pinhole camera model is the simplest optical system that can be used for modeling camera. It is a simplified model of a camera, aimed at defining the camera/lens equation, which relates a point on the image plane, x, to world coordinates, X, through camera matrix, K, the rotation, R, and translation of the camera, t:

$$x = K[R\ t]X \qquad \text{Equation 1}$$

Figure 3:
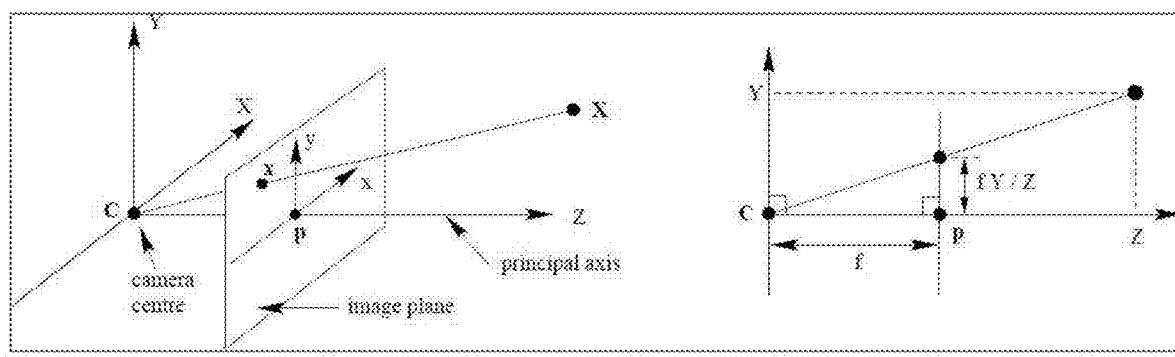
FIG. 3 is a diagram depicting the geometry of a pinhole camera.

A coordinate system of the pinhole camera model is shown in FIG. 3. In this model, a camera is treated like a black box that does not allow light but for a pinhole, located at the camera center, C. Light enters the pinhole and is projected onto the back of the box, the image plane, which is centered at the principle point, p, and located at distance, f, the focal length, along the camera's principle or optical axis. In FIG. 3, the camera's optical axis coincides with the camera's Z axis and the X and Y axes align with the x and y axis of the image plane.

To better understand camera focus, an understanding of lenses is necessary. A lens is an optical component that can either diverge or converge light incident on its surface. In practical applications, an optical pipeline is typically comprised of multiple lenses or lens components that are pipelined or staggered together, placed one after another and so on. Light converges or diverges for a few reasons; the most important one is to reduce the size of the image. This is done to address challenges such as grabbing an image of a large field of view. Another reason is to improve the image's quality. A lens then redirects light in to accomplish these and other relevant practical requirements to have the information carried by light be successfully incident on an image sensor plane. A sensor plane is just the surface of an image sensor, comprised of subpixel elements where information from light is captured. Image sensors may be CMOS, CCD or another type of sensing modality. Changes in the size of the image relative to the scene are referred to as image or optical/lens magnification.

The convergence of light onto the sensor also matters for image sharpness: the sharper the image, the more information that the sensor can resolve. Often times, the optical spatial resolution is defined in lines pairs per mm or lp/mm, meaning how many line pairs may be resolved by the sensor/lens camera module at a given distance. The better the contrast of an image, i.e. the sharper the image, the more lp/mm may be resolved. This is crucial for computational cameras since the more line pairs that can be resolved, the better accuracy that the system will have. The camera's Modulation Transfer Function (MTF) captures a measure of line pairs per mm (lp/mm). An understanding of MTF is required for better understanding camera resolution and subsequent camera measurement accuracy.

Camera Focus and the Modulation Transfer Function

In manufacturing or assembling a computational camera, a camera focus process at mass scale will typically involve a camera focus station. Focus is set to a given distance and the focus process itself is either done manually or automatically. One focus metric that is commonly used is the Modulation Transfer Function or MTF, which is a component of the Optical Transfer Function or OTF.

A transfer function is defined to identify different parts of an optical lens field of view and the quality of the contrast itself. Specifically, the OTF describes the response of the optical system to known inputs. The OTF consists of two components: the MTF (which is the magnitude component of the OTF), and the Phase Transfer Function (PTF) (which is the phase component of the OTF). The approach employed in this disclosure will focus on the MTF. Note that both components of the OTF are very relevant and can be integrated into the entire analysis and the approach presented in this disclosure as another relevant lens/camera parameter.

Figure 4:
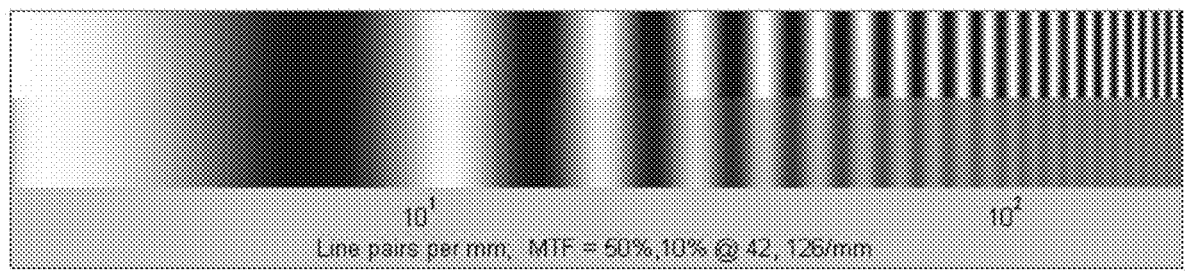
FIG. 4 is a depiction of a Sine pattern (pure frequencies) from 2 to 200 lp/mm.

Broadly defined, MTF is an objective measure of the quality of an image formed by a lens or electro-optical system. It is defined as the ratio of the image contrast to the target contrast, expressed as a function of spatial frequency, f, where contrast, C(f), is given by:

$$C(f) = \frac{I_{max} - I_{min}}{I_{max} + I_{min}} \qquad \text{Equation 2}$$

where $I_{min}$ is defined as the minimum luminance for a pattern at frequency, f, assuming a sine pattern, such as the one shown in FIG. 4 (depicting a Sine pattern (pure frequencies) from 2 to 200 lp/mm), while $I_{max}$ is defined as the maximum luminance for a pattern at frequency, f.

Note that image Contrast at zero frequency, pure white or pure black, is given by:

$$C(0) = \frac{I_{white} - I_{black}}{I_{white} + I_{black}} \qquad \text{Equation 3}$$

Where $I_{black}$ is defined as the minimum luminance for a pattern at zero frequency, while $I_{white}$ is defined as the maximum luminance or pixel value at zero frequency (a negative peak or valley) C(0) is typically equal to unity.

The MTF function is therefore given as:

$$\text{MTF}(f) = 100\% * C(f)/C(0) \qquad \text{Equation 4}$$

Where the spatial frequency, C(f), is measured in lp/mm or line pairs/mm and C(0) is the value of the spatial frequency at 0 frequency.

Figure 5:
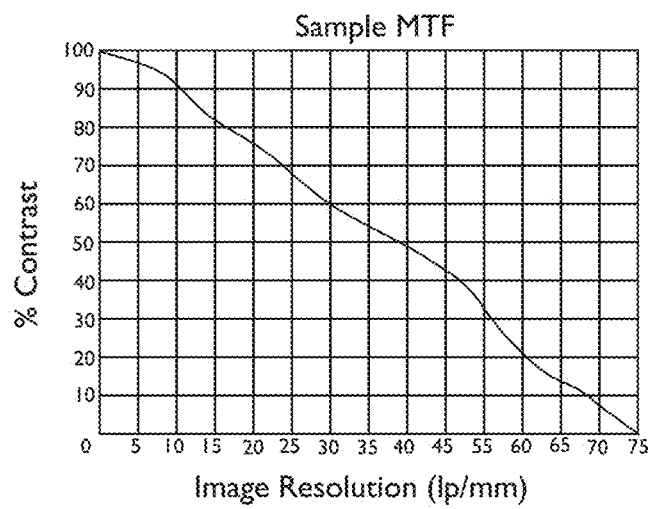
FIG. 5 is a graph depicting a sample MTF function relating % contrast to image resolution.

An MTF function for an example camera lens is depicted in FIG. 5 which includes a sample MTF function relating % contrast to image resolution. MTF is presented as a plot of image contrast, measured in percent, against a spatial frequency, C(f) measured in lp/mm. The MTF of a camera system is the product of the MTF of the individual components, i.e. the lens, image sensor, image capture boards, video cables, etc. Table 1 depicts a relationship between pixel size, resolution, and a resulting megapixel count for two typical size sensors (½" and ⅔").

TABLE I

| | Pixel Size (μm) | | | | | | | | |
|---|---|---|---|---|---|---|---|---|---|
| | 9.9 | 7.4 | 5.86 | 5.5 | 4.54 | 3.69 | 3.45 | 2.2 | 1.67 |
| Resolution (lp/mm) | 50.5 | 67.6 | 85.3 | 90.9 | 110.1 | 135.5 | 144.9 | 227.3 | 299.4 |
| Typical ½" Sensor (MP) | 0.31 | 0.56 | 0.89 | 1.02 | 1.49 | 2.26 | 2.58 | 6.35 | 11.02 |
| Typical ⅔" Sensor (MP) | 0.59 | 1.06 | 1.69 | 1.92 | 2.82 | 4.27 | 4.88 | 12.00 | 20.8 |

Measuring the MTF of a Given Camera

Figure 6:
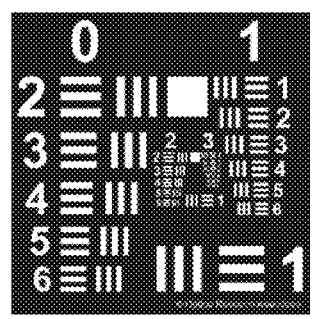
FIG. 6 is a USAF 1951 Resolution Test Chart.

MTF measurements, also called vanishing resolution measurements, involve capturing an image of a bar pattern, typically the USAF 1951 chart, shown in FIG. 6, and identifying the highest spatial frequency (lp/mm) where the bar pattern is visibly distinct. MTF measurements typically correspond to an MTF of 10%-20% (i.e. the spatial frequency where the MTF is at 10%-20% of its peak value) and are strongly impacted by observer bias, if the process of focusing a camera is done manually. The most common measure of MTF is MTF50 or the spatial frequency where the MTF is at 50% of its peak value. MTF50 correlates well with perceived sharpness and is widely used because it corresponds to bandwidth, the half power frequency [4]. Note that the numbers on the figure represent different line pair estimates.

There are various methods to also evaluate parameters for lens alignment relative to the camera. These include standard multi-view and single-view camera calibrations, which will be discussed a bit later in the document. Such parameters include the optical axis, defined in subsequent section on Intrinsic camera parameters. Lens alignment is a metric to determine how well a lens is aligned with the center of the image sensor. Another method attempts to focus the camera at the Hyperfocal Distance to ensure maximum sharpness from half the hyperfocal distance all the way to infinity. The Hyperfocal Distance is defined as the distance which places the furthest resolvable edge of the depth of field at infinity.

The present disclosure is the first presentation of a method and system that can simultaneously align the camera's optical center with its image sensor center and derive the MTF requirements, while also focusing the camera, and iteratively evaluating the camera's other intrinsic parameters, such as the effective focal length and image sensor center.

Camera Module Parameters

To improve camera performance, an understanding of what defines camera parameters is first needed. These parameters will then be used to define a localized subset of parameters that define different parts of the field of view. This approach is used to ultimately improve overall performance of a computational camera. A better understanding of lens/camera parameters is desirable to describe the system and method for accomplishing such a goal.

Intrinsic Camera Parameters

In a camera system, an optical sensor receives incident light that is focused through a lens onto the image plane. Image formation is governed by the intrinsic and extrinsic parameters of the camera. The intrinsic parameters define the internal geometry of the camera, and the extrinsic parameters define the location and orientation of the camera with respect to the world frame.

Intrinsic parameters include the image sensor format, the effective focal length, the principle point, the skew angle and the lens distortion coefficients, where:

Image sensor format is a description of the sensor dimensions, and, when combined with the given image resolution, also defines the image pixel size in mm, for example: ½", 1/3.2", 1", 752×480. While format specifically describes the size of a vacuum tube needed to produce the image rather that the diagonal measure of the sensor, the related physical size of the sensor and number of pixels enable the measurement of focal length in pixels.

Effective focal length is the estimated optical distance from the point where light rays converge to the image plane, typically measured in millimeters. In the camera matrix, the focal length, f, is defined with respect to pixel size, p. The focal length may be different in the vertical and horizontal directions, according to variability in lens aspect ratios.

The principle point is the location of the camera's optical center, the point where the optical axis strikes the image plane. In simplified representations, the optical center can be assumed to coincide with the image sensor center. However, manufacturing defects can cause misalignment.

The skew coefficient encapsulates the angle between the axes of the image plane, $\alpha$, where the coefficient is given as a function of the focal length, f, and vertical pixel size, p:

$$s = \frac{f}{p_y}\tan(\alpha) \qquad \text{Equation 5}$$

In simplified and reduced models, the camera can be assumed to have a skew coefficient of zero, meaning the angle between the axes is assumed to be 90 degrees.

The distortion coefficients are the coefficients of the non-linear radial and tangential distortion model, which map straight lines in the real-world to curved lines in the image.

With the exception of the distortion coefficients, intrinsic parameters are encapsulated in the camera matrix, K, shown in Equation 6:

$$K = \begin{bmatrix} \frac{F}{p_x} & s & c_x \\ 0 & \frac{F}{p_y} & c_y \\ 0 & 0 & 1 \end{bmatrix} \qquad \text{Equation 6}$$

Where F is the camera's focal length, p is the size of a pixel as represented by the image sensor format, c is the principle point, and s is the skew coefficient.

Extrinsic Camera Parameters

Figure 7:
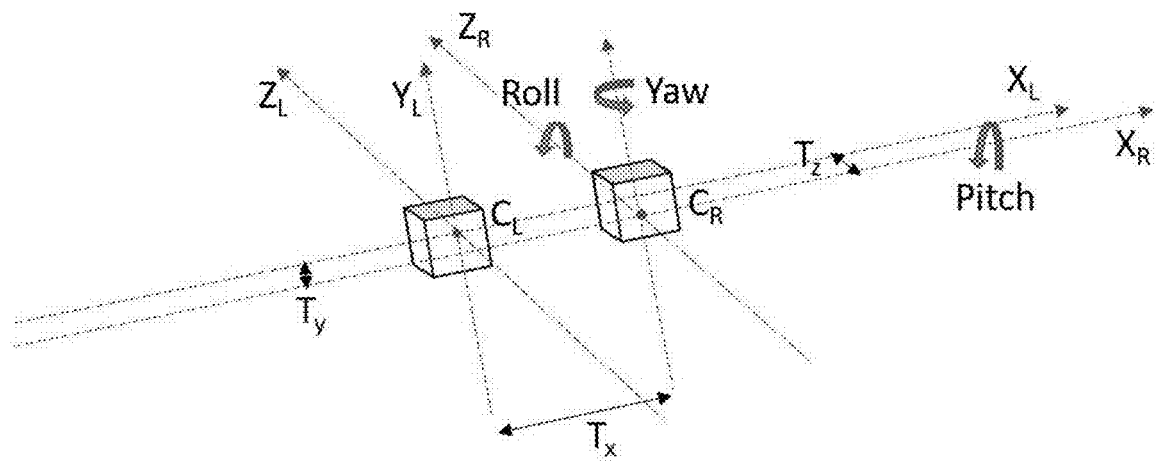
FIG. 7 is a diagram illustrating extrinsic camera parameters.

Extrinsic parameters define a common coordinate system between the various nodes of a multi-camera system and include translation parameters, T, such as distance between nodes in x, y, and z as well as rotation parameters, such as pitch, P, yaw, Y, and roll, R, which are defined as the rotation about x, y, and z respectively. FIG. 7 illustrates the extrinsic parameters of a computational stereo camera system containing, left and right camera nodes, C, where each camera has separate optical axes, X, Y, and Z.

Table 2 provides a list of sample intrinsic and extrinsic parameters for a stereo rig including tolerances.

TABLE 2

Sample intrinsic and extrinsic parameters and tolerances of a computational camera module

| Parameter | Specification | Minimum | Maximum |
|---|---|---|---|
| Focal Length | 5.37 ± 0.2 mm | 5.17 mm | 5.57 mm |
| Aspect Ratio | 1.0 ± 0.072 | 0.928 | 1.078 |
| Horizontal Optical Center | 2.4 ± 0.275 mm | 2.125 mm | 2.675 mm |
| Vertical Optical Center | 1.8 ± 0.275 mm | 1.525 mm | 2.075 mm |
| X Translation | 70 ± 0.55 mm | 69.45 mm | 70.55 mm |
| Y Translation | 0 ± 0.55 mm | −0.55 mm | 0.55 mm |

TABLE 2-continued

Sample intrinsic and extrinsic parameters and
tolerances of a computational camera module

| Parameter | Specification | Minimum | Maximum |
|---|---|---|---|
| Z Translation | 0 ± 0.55 mm | −0.55 mm | 0.55 mm |
| Pitch | 0 ± 1.6 deg | −1.6 deg | 1.6 deg |
| Yaw | 0 ± 1.6 deg | −1.6 deg | 1.6 deg |
| Roll | 0 ± 1.3 deg | −1.3 deg | 1.3 deg |

The Geometric Camera Calibration Process

Geometric camera calibration is the process of estimating the intrinsic and/or extrinsic parameters of a single camera or multi-camera system. In the case of a multi-camera system, intrinsic parameters, such as the ones described in the previous section, are derived for each camera while the extrinsic parameters define the position of each camera relative to a common coordinate system.

Camera calibration is a necessary first step for many camera applications, including correcting for lens distortion, measuring the size of an object in world units (mm), determining the location of the camera in a scene, or estimating 3D structure from camera motion.

Camera calibration is accomplished by estimating the camera parameters using correspondences between 3D world points and 2D location on the image plane. Point correspondences are most commonly obtained using a calibration pattern, such as a checkerboard.

Manufacturing a Computational Stereo/Multiview Camera

As recognized by the inventors of the present application, to mass produce computational cameras of any type, an advanced manufacturing and assembly line is needed. The goal of any manufacturing line is to mass produce a camera design with the fewest number of bad samples possible and the best yield. As mentioned earlier, yield is challenging, especially with new and innovative cameras. Yield may reflect the manufacturing line's robustness in handling variations on manufacturing tolerances or in handling variations in component tolerances. Yield, therefore, reflects the realities of the tolerances that are associated with the components themselves as a preliminary step. Secondarily, yield also reflects the quality of the assembly process and the tolerances that the manufacturing and assembly processes may comply or not comply with. Producing a product with low yields may lead to expensive product ramp-ups and an associated "bone yard" of defective cameras that may not be salvaged or recycled back into the manufacturing line. It is the goal of every product manufacturing line to minimize bad manufacturing practices and to maximize yield, keeping in mind the components' tolerances and the manufacturing tolerances.

The component tolerances for a typical camera module may include the image sensor noise levels, other data line electro-static noise, lens imperfections, among many others.

Manufacturing tolerances may include allowed value variability of electric components, variability within a printed circuit board (PCB), lens imperfections and variations within a lens, and multi-view camera distances. For camera distances, a stereo camera, for instance, is comprised of two or more cameras with a baseline made up of rigid material. However, the baseline may be susceptible to heat, expanding or contracting within a given tolerance. The baseline may also not be accurate enough, within given tolerances. Accounting for thermal impact as part of the calibration process is also crucial.

If one or more of these tolerances, be it on the component level or in the manufacturing process, is not met, the result could lead to a failed product unit. This in turn leads to a lower yield and more overall costs for the manufacturer. To minimize these failures, it would be beneficial to develop a new manufacturing process that can iteratively check the cameras while they are being assembled instead of at the end, as is often the case.

PCB Station—Printed Circuit Board Assembly

Figure 8:
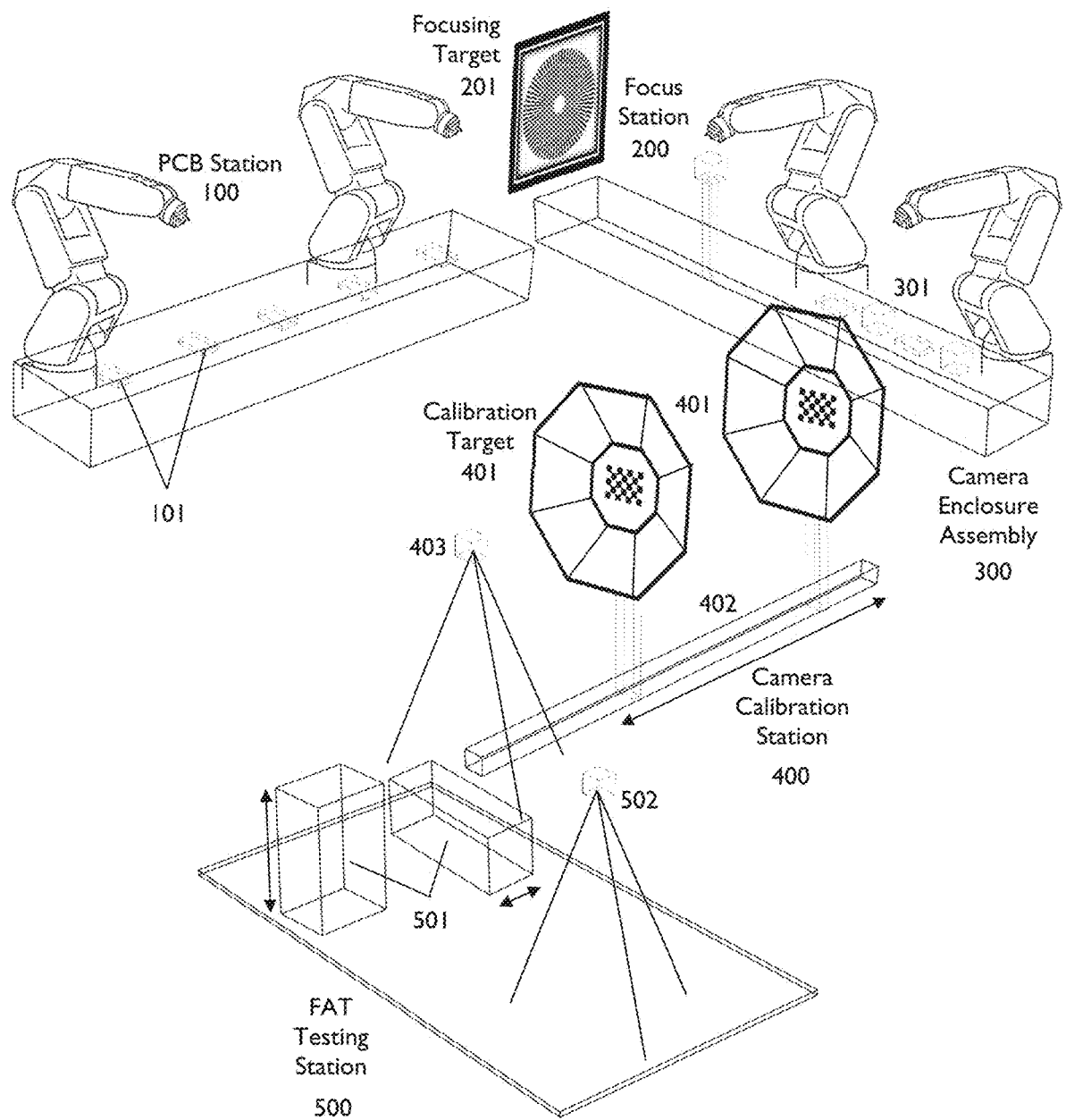
FIG. 8 is a diagram depicting a camera manufacturing line with 4 stations.

FIG. 8 depicts a manufacturing line that may be used in accordance with this disclosure. A printed circuit board (PCB) 101 is first assembled at a PB station 100. Such a circuit board will typically contain the image sensor, the transmission lines from the image sensor to other chips on board the circuit. The PCB contains all the logic for extraction of data from one or more image sensors, the formation of the images and, in many cases, the existing logic for deriving measurements and actions from image data.

Focus Station—Focusing the Cameras

After the PCB 101 is assembled with the image sensor and associated logic, the lens is placed on top of the image sensors and image focusing is attempted in at focus station 200, employing a focusing target 201 shown in FIG. 8. Focusing of a camera in accordance with this disclosure has been described. has been described above in paragraphs 34-36. At camera focus station 200, a printed circuit board 101 with a CMOS or CCD image sensor is preferably placed in a specialized holder. An image lens and the associated lens components are then placed on top of the CMOS sensor location on the printed circuit board. Facing the sensor/lens combination is a series of focus patterns and resolution charts, as depicted at focusing target 201. Focusing is a mathematical estimation at best and a manual process at worst. This means that this step may be especially prone to issues. These issues will be expanded upon below. One of the goals of focusing the camera is to align the optical axis of the camera with the image sensor. There is also typically an effective focal length of every camera that is defined by the manufacturer.

Camera Calibration Station

Once a camera has been focused, it is then calibrated at a camera calibration station 400. The camera to be calibrated is first positioned at location 403. A target such as a calibration target, presented in U.S. Pat. No. 10,607,370 issued Mar. 31, 2020, the contents thereof being incorporated herein by reference, and depicted as item 401 of FIG. 8 may be employed. Calibration target may be positioned at any desired position along calibration support rail 402. As described above, the camera calibration process extracts the intrinsic and extrinsic parameters and writes such information to permanent memory onboard the camera. This step in the manufacturing process is where the camera is turned into an accurate, application-specific measurement device.

Camera Enclosure Assembly

After calibration, the calibrated camera is passed to camera enclosure assembly station 300. At this step, the camera enclosure, depicted at 301 of FIG. 8 is assembled, such that the entire camera is packaged together. The camera would then assume its final form.

Final Acceptance Testing

Final Acceptance Testing or FAT comes next and is performed at FAT testing station 500. The camera is positioned at location 502 and items 501 are imaged. The resulting image data is compared to the known results and final confirmation of performance is made. As a final step, the camera may be physically inspected for manufacturing issues and inconsistencies. Application-specific measurement testing is also conducted to assure camera accuracy and consistency.

Upon completion of this step, a camera is ready to be deployed to a customer. As mentioned earlier, these steps represent an abridged version of the manufacturing process. They do, however, cover the relevant sections to this invention, in terms of improving the accuracy and consistency of manufacturing computational cameras. The subsequent sections will cover some of the issues and risks that are associated with the manufacture of such high-accuracy and high-performance cameras and how to mitigate many of them.

Issues with the Manufacturing Process of Computational Cameras

Manufacturing computational cameras can be potentially very challenging. Cameras, at their essence, are viewing devices not measurement devices. Taking a view device and transforming it into a measurement device presents a number of challenges. Breaking down the camera module into its pieces, the PCB, the lens and the manufacturing process.

Issues with the PCB Assembly

Figure 9:
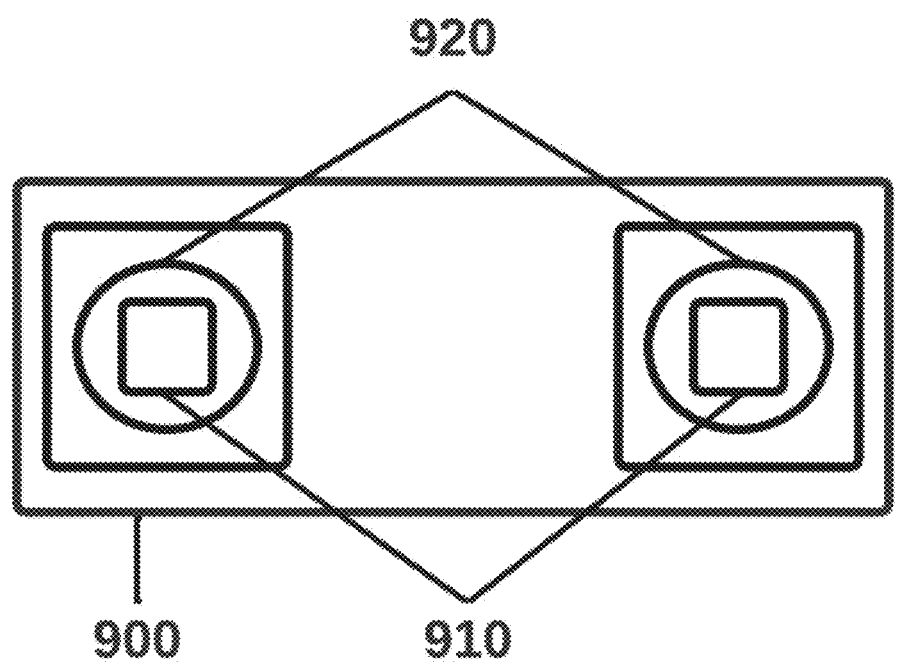
FIG. 9 depicts an example PCB layout of a computational camera.

During the assembly of the PCB, the inventors of the present disclosure had recognized that issues may arise if there is noise on the data lines, for instance. Other issues may arise during assembly if the data lines coming from the image sensors don't have matched impedance. Data lines with matched impedance are matched in length as well as in width. This is important because data coming out of the same sensor have to arrive at a processing chip at the same time. There are many more issues that may arise during PCB assembly. While there are multiple tests and inspection steps that usually take place during this step, with cameras, the ultimate test is to see the images as part of a video stream step. FIG. 9 is an example PCB layout of a computational camera from EDGE3 Technologies. The PCB 900 is comprised of two image sensors 910, lens mounts 920 on top of the image sensors 910 and logic to power and operate the camera as well as interface between the camera and a compute model that may be on or off the camera.

Issues with Focusing Cameras on Manufacturing Lines

The focus station (see FIG. 8) is the first time when images from a manufactured camera may be viewed. The camera is focused at a given distance, per the camera focus station described earlier. As stated earlier, the primary goal is to have a given image sharpness at a given distance. The effective focal length of a camera may be outside of the allowed tolerances of the targeted focal length. Optical axis alignment with the image sensor may also not be aligned. The image sensor plane between multiple cameras may also not be aligned.

At this step, other image anomalies such as image blemishes, image artifacts from PCB assembly or other issues are typically addressed. In a highly automated focusing station, there is minimal human intervention or inspection. This renders cameras even more prone to issues.

Issues with the Camera Calibration Station

Cameras being calibrated also have issues associated with them. The calibration targets have to be highly accurate. Assuming that the target is non-stationary and can move to different preset positions (such as with the focusing station pictured in FIG. 8 and as more completely disclosed in U.S. Pat. No. 10,607,370 issued Mar. 31, 2020, the contents thereof being incorporated herein by reference, then pixel resolution, pixels/mm for instance, becomes relevant. Image focus will play a major role in defining the accuracy of calibration. In particular, the inventors of the present disclosure have recognized that if the lens resolution in lp/mm is not high enough or consistent enough between different parts of the image, calibration will be impacted. Typical computational cameras will leave the manufacturing line with a single calibration set of parameters. Such calibration parameters are based on the data that has been collected during the calibration process. It is only in accordance with the present disclosure that variations in one or more camera lenses are considered. Previously, there has been an assumption of instead a symmetrical lens in terms of resolution. This is a major issue in calibration and subsequent computational measurements being made by the camera. This impacts yield and causes a slowdown in the overall process. To combat this issue, many manufacturers resort to tedious manual processes that slow down production and resort to expensive designs to better accommodate for the shortcomings of the components and assembly. The present disclosure instead recognizes the portions of a lens most able to resolve the highest resolution and suggests to a user how to employ these highest resolving lines portions. The present disclosure also allows for the combination of a plurality of lenses, and thus allowing the highest resolving portions of each of the plurality of lenses to be employed in a matrix-like array.

Improving Lens Focus by Iterating Focus and Calibration

Given the issues noted above related to focusing computational cameras and the importance of focus in the performance of computational cameras, one of the first priorities in improving overall performance is recognized by the inventors of the present disclosure as improving overall lens/camera focus. The approach takes advantage of the presence of a calibration station, such as the one depicted in FIG. 8 and disclosed in U.S. Pat. No. 10,607,370 issued Mar. 31, 2020, the contents thereof being incorporated herein by reference. The calibration station is capable of estimating intrinsic and extrinsic parameters, as noted above.

Figure 10:
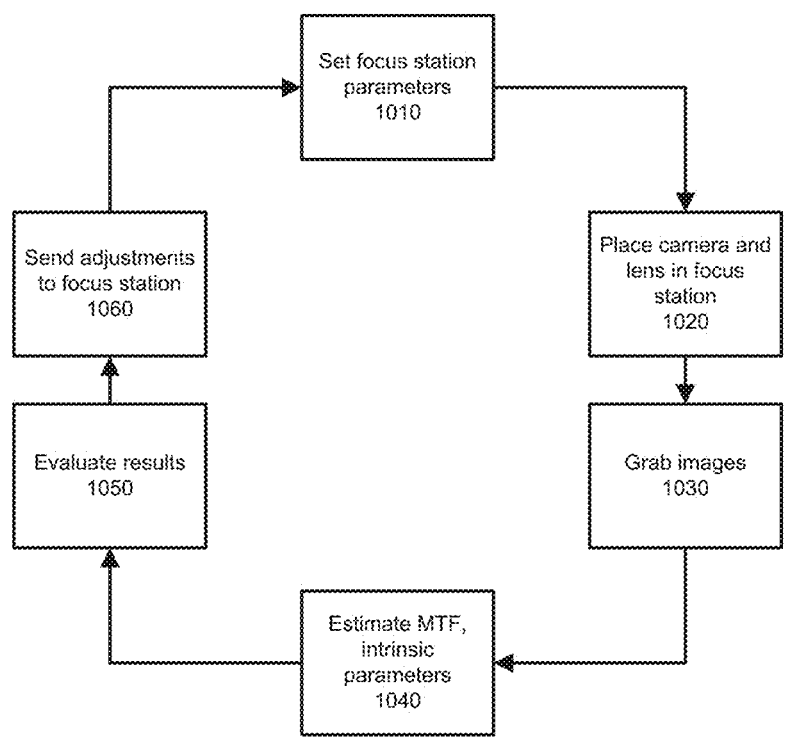
FIG. 10 is a flowchart depicting an overall process of simultaneous estimation of MTF values and intrinsic parameter values.

Focus is improved by iterating between the calibration station and the focus station. This approach relies on the disclosure, and therefore incorporates by reference, the contents of U.S. patent Ser. No. 16/002,593 titled Method and Apparatus For Camera Focus Alignment, filed Jun. 7, 2018 to El Dokor, the contents thereof being incorporated herein by reference, the approach of which is also depicted in FIG. 10. FIG. 10 describes a process for the simultaneous estimation of MTF values and intrinsic parameter values. Initially at steps 1010 the focus station parameters are set and then at step 1020 the camera (including one or more lenses) are placed in the focus station and the focus is measured. The camera (including one or more lenses) are then moved to the calibration station. Once placed, at step 1030 one or more images are captured using the camera and lens combination being tested as the capture system. At step 1040 the camera calibration parameters, including the MTF and other intrinsic parameters, are extracted. These calibration parameters including focus-relevant estimated parameters are then used to evaluate the focus quality of camera and whether or not it meets the targeted focus requirements by stereo station at step 1050. Once the focus parameters are extracted, should they be outside of the tolerance thresholds of the target parameters, the camera and any required adjustments to the focus station parameters, is then returned to the focus station at step 1060 for focus modification. The process is iterated as often as is needed until the targeted focus parameters are met. MTF values may also be extracted for utilization in this process. (The entire process involves mechanical steps. These have to line up with the testing from the calibration station. In other words, inconsistencies from the focus station will be quantified at the calibration station.)

In addition to testing focus results, overall image quality may also be assessed. For instance, blemish analysis may also be included at this step and, depending on blemish locations, may lead to returning the camera to the focus station.

Such targeted parameters at the calibration station may include:
- Convergence criteria for the hyperfocal plane, with the goal of matching the camera specs' targeted hyperfocal plane. To make sure that the camera focus is consistent with the target specs, convergence criteria involving
- Convergence criteria for the optical axis alignment along with alignment of the optical center with the goal of minimizing the delta between the two in pixels.
- Convergence criteria for the Effective Focal Length with the goal of matching the targeted effective focal length
- Simultaneous Blemish Analysis for assessment of overall image quality.

Figure 11:
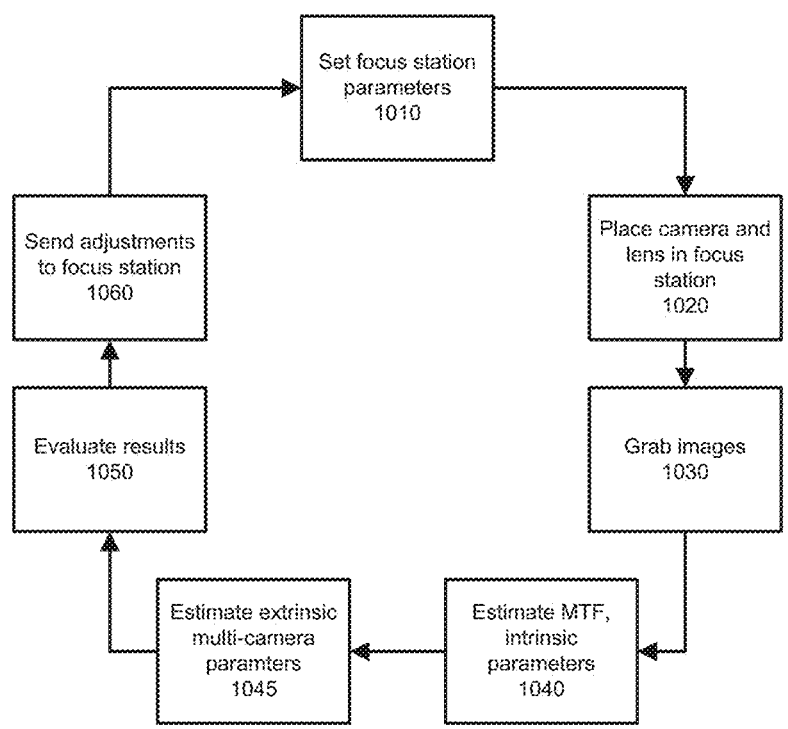
FIG. 11 is a flowchart depicting an overall process of simultaneous estimation of MTF values, intrinsic and extrinsic parameter values.

A modification of the approach is presented in FIG. 11 in which the extrinsic parameters are extracted as well at step 1145. This step is desirable if the focus station is also estimating the accuracy of baseline distance between two or more camera modules comprising a computational camera.

Improving Camera Accuracy Via Localized Calibration Parameters

Inconsistency in lp/mm across a lens field of view was discussed above in this disclosure. While the theoretical domain defines one set of intrinsic and extrinsic camera parameters for a single camera module, the reality is that the lens pipeline itself may be riddled with inconsistencies and may also not be omni-symmetrical. To address this issue, localized calibration parameters in the lens's field of view are preferably utilized. In other words, the goal is to have the system understand where it can measure less accurately and where it can measure more accurately. Where the system can measure accurately, the confidence in the measurement is higher and so is the confidence in the pixel resolution (pixels/mm). In an alternative embodiment, an array of a plurality of lenses may be employed so that the portion of each lens where the system can measure more accurately may be used in combination with similar outputs from the other of the plurality of lenses, thus allowing the plurality of lenses to resolve the highest possible resolution for the greatest percentage of an image.

Therefore, in accordance with the disclosure, define different omni-symmetrical regions, $R_n$, within the lens in the image, based on localized parameters, such that:

$$x_n = (x_n, y_n, lp_n)^T \qquad \text{Equation 7}$$

where $x_n$, $y_n$, $lp_n$ are the x-coordinate and y-coordinate of the center of the omni-symmetrical region, $R_n$, along with the focus in lp/mm for the region. Note that:

$$l = \bigcup_n R_n + c \qquad \text{Equation 8}$$

Such that the lens's field of view, l, is approximately comprised of the union of all the omni-symmetrical regions, $R_n$, as well as an error constant, c.

It also follows that for every such region, there are different approximately estimated intrinsic and extrinsic parameters. This, in turn, leads to different calibration parameters being used for three-dimensional estimation of points in the field of view of the camera. For every region, $R_n$, there exists a separate set of calibration parameters $\varsigma_n$ being used for the three-dimensional parameter estimations.

Given that the calibration parameters are used to estimate the 3D coordinates of a given object/segment in the field of view, it follows that a vector, $V_n$, in the field of view that is subtended in the image plane within a region, $R_n$, can be defined as:

$$V_n = (x, y, z)^T \qquad \text{Equation 9}$$

Utilization of Localized Focus Information

In this section, it has been recognized by the inventors of the present disclosure that the notion that the lens/camera combination is an optically monolithic object with a set of globally defined properties is incorrect. Given that the image field of view is approximated by a series of omni-symmetrical regions, it follows that the image, I, can be approximated by a series of sub-images, $I'_n$, such that there are as many sub-images as there are regions with omni-symmetrical optical consistency. For a measurement application, it is crucial to know the accuracy of the computational camera, the derived sub-images now define the accuracy, given the properties and attributes associated with them, such as localized intrinsic/extrinsic parameters, localized optical resolution in lp/mm, localized blemish analysis, etc. A much more accurate and practical system can now be utilized that can guide measurement towards a more accurate result. For instance, by knowing the spatially relevant strengths weaknesses of the system's field of view, derived earlier from the localized sub-images, the camera position/angle of image acquisition can be modified. Parts of the field of view subtended by higher quality sub-images with better resolution require fewer pixels. Parts of the field of view that have lower quality sub-images will have more pixels associated with them from the field of view. The approach is an optimization of field information via prior knowledge of sub-image and region-by-region resolution.

For inline manufacturing, the process of saving localized camera calibration and other parameter information is accomplished by modifying a typical camera assembly process to account for such information. As shown in FIG. 12, the camera calibration step for inline manufacturing is preferably run with multiple output calibrations representing localized lens/camera information and associated parameters. This information may then be stored onboard the camera, for instance, in the camera's EEPROM, or other non-volatile memory, in a Camera calibration repository. Once Final Acceptance Testing (FAT) has been completed, calibration and other camera parameter information can then be saved for reference in a central repository.

Practical Application—Measuring the Size of a Cuboid Object

In logistics applications, measurement devices need to be certified for trade. Certified for Trade is a term used to describe systems that have gone through a process whereby a governing body certifies that a given measurement device provides accurate, reliable and consistent data. For instance, if a customer goes into a UPS' store and weighs their box, they expect the value to be accurate and consistent. UPS may also charge for the dimensions of the box. Dimensional weighting is the process of taking the dimensions and the weight of the box. All the weights and measures used at UPS, FedEx® or any other relevant store are certified for trade. To dimension a box, i.e. to measure the size of a box, a certified for trade 3D measurement device has to be used. How can a 3D measurement device with an optical pipeline that is full of imperfections, with a lens that has an inconsistent optical/spatial resolution be reliable enough to be certified for trade? The camera/lens combination is further broken up into multiple sub-images, $I'_n$, with omni-symmetrically optical features involving camera intrinsic and extrinsic parameters, lp/mm signal to noise ratio, blemishes etc. as defined previously.

If there is a need to measure the size of a cuboid object, such as an Amazon® delivery box, a stereo camera may be used for such measurements. In order for such measurements to be successful, the computational stereo camera has to be calibrated. As part of the calibration, the optical pipeline of the individual lenses of each camera has to be placed in focus-individually. The discrepancies that are typically associated with the lens manufacturing process, manifesting themselves in measurements of lp/mm then become a major concern. Such discrepancies lead to a lack of consistency in the measurements. The approaches presented above work well if the goal is to improve image focus. However, lens inaccuracies may wreak havoc on the focusing step. The goal of the lens focusing step is to maximize focus/resolution in line pairs/mm during this step. Often times, however, lens imperfections make this process inaccurate and imperfect at best. The focusing station then looks at different parts of the field of view and determines the different resolutions that are associated with such parts during the focusing process. Sometimes such imperfections may be systemic, i.e. the same regions for a given may have a lower resolution. Manufacturers may even reject such focused optical pipelines altogether. If a given optical pipeline has regions in the lens that may not be able to resolve values better than a given targeted resolution, then that manufactured camera-lens combination is either 1) sent back to the focus station for another attempt, or 2) discarded. Manufacturers will typically place a limit on how many times a camera is allowed to be refocused before it is discarded. Discarding the camera, an all too common and eventual step, impacts the yield that is associated with the manufacturing process. This increases cost and stretches out the timeline for perfecting the manufacturing process. At other times, the resolution discrepancies may not be systemic. In such cases, the challenge becomes even bigger. It would be difficult to track down a non-systemic problem. Given a lens part from a manufacturer, there is a limit for the lens resolution accuracy. Perfect lens resolution, concentrically across a lens, is virtually impossible in real world applications. The discrepancy in resolution deeply impacts the measurement process. Absent a mitigating step, once a camera is deployed, its measurement process will become flawed and compromised. Even in-field calibration techniques may mitigate some aspects of the measurement process, but they will never alter the physical characteristics that are associated with the camera.

FIG. 13 highlights a hypothetical optical pipeline with different lens features/resolutions in different parts of the camera/lens field of view subtending a cuboid object. Note that the image field of view is comprised of multiple sub-images. For purposes of illustration, the field of view is broken up into quadrants of sub-images with uniform resolution with them. Note that sub-image $I_1'$ has an especially higher resolution, so does $I_2'$. The user placed the cuboid object in an initial angle depicted in FIG. 13 (a). The length portion of the cuboid has too few pixels, relative to the lower resolution that is associated with sub-images $I_3'$ and $I_4'$. The user may then be prompted to reorient the camera so that the longer side of the cuboid object occupies more pixels in the field of view, as is therefore shown in FIG. 13 (b).

As mentioned earlier, the process of computational camera measurement becomes an optimization between the pixel resolution of each sub-image and the number of pixels subtending the object itself. Note that the camera's calibration parameters will vary with use once the camera is deployed. Regular calibration processes and localized parameter computation needs to be done to ensure proper functioning of the camera. This process may be done in real-time during real world use or separately at a measurement station Temperature as a Camera Parameter Temperature may also affect performance by warping the lens itself and/or affecting the baseline distance as well as overall physical relationship between the cameras and the components. One way to mitigate this behavior is to associate calibration parameters with temperature range, defining a lens thermal profile. A temperature profile defines a set of temperature ranges, such that for every temperature range, there will be a set of optical and calibration parameters that are specific to the lens at that temperature. Such parameters will include the aforementioned intrinsic, extrinsic, blur, and other localized, per-region parameters.

Calibrating a camera at different temperature ranges can be done by placing the camera in a temperature-controlled chamber and conducting calibration within it, at different temperature ranges. The information is then stored locally in the camera or in a different repository.

Multi-Lens Array

In an alternative embodiment of the invention, a plurality of lenses may be evaluated as noted above. Once each of the lenses is evaluated, the lenses may be positioned within an array to image a particular scene. After imaging, defined portions of each image extracted from each of the fields of the view of the array of lenses may be combined into a single combined image of a highest resolution.

A method has been developed to iteratively improve camera accuracy via localized calibration parameters of omni-symmetrically uniform camera regions, defined as sub-images. Each of the sub-images will have its own lens/camera parameters. These parameters are, in turn, used to improve overall performance. Measurement accuracy is improved via an optimization process between sub-image performance and the number of pixels subtended on a measurement target. The method therefore provides the following benefits.

New system combining MTF measurements with single camera intrinsic parameter estimation
  Modification of the focus and camera/lens alignment rig to account of parameter estimation
  Iterating the process until the alignment criteria are met
  Extending the process to a multicamera rig with the estimation of the individual intrinsic parameters, the individual MTFs and associated hyperfocal planes and the extrinsic camera parameters
  Modifying the calibration of the camera and localizing it to different levels of localized camera resolution. This is accomplished by adding localized bias values associated with localized calibration values.
  Localized omni-symmetrical sub-images each with its own camera/lens parameters
  Storing localized calibrations into EEPROM or other nonvolatile memory.
  Storing localized calibration biases into EEPROM or other nonvolatile memory
  Measurement accuracy improvement via an optimization process between sub-image performance and the number of pixels subtended on a measurement target Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

The aforementioned disclosure may be applied to a multi-camera system as well as other applications such as single or multi camera systems with structured light sources. The same concepts of calibration under different temperature variations as well as calibration for different lens distortions can be directly applied during their calibration processes, regardless of what calibration approach is fundamentally used to get camera parameters and measure distance/size.

What is claimed:

1. A method for calibrating a lens array, comprising:
   defining a plurality of omni-symmetrical regions within each lens within the lens array;
   defining a localized set of calibration parameters for each of the plurality of omni-symmetrical regions for each lens within the lens array;
   determining one or more portions from one or more of the lenses in the lens array that when combined provide a higher resolution image than would be available from any single lens withing the lens array; and
   combining the one or more determined portions to generate a high resolution image.

2. The method of claim 1, wherein a field of view of each of the one or more lenses comprises the combination of fields of view of the plurality of the omni-symmetrical regions.

3. The method of claim 1, wherein the one or more localized set of calibration parameters comprise one or more intrinsic parameters of each of the omni-symmetrical regions for each of the one or more lenses.

4. The method of claim 3, wherein the one or more localized set of calibration parameters further comprise one or more extrinsic multi-camera parameters.

5. The method of claim 1, wherein, upon use of the calibrated lens array to image an object:
   determining whether a portion of a field of view of each of the one or more lenses corresponding to one of the particular omni-symmetrical regions imaging the object includes resolving ability sufficient for resolving the object; and
   displaying to a user instructions for repositioning the lens array relative to the object when it is determined that a portion of the field of view of the lens array corresponding to the particular omni-symmetrical regions imaging the object does not have resolving ability sufficiently for resolving the object.

6. The method of claim 1, further comprising:
   associating a first array lens temperature range with the localized set of calibration parameters; and
   defining a second localized set of calibration parameters for each of the plurality of omni-symmetrical regions associated with a second lens array temperature range.

7. The method of claim 6, further comprising:
   defining an additional plurality of localized sets of calibration parameters for each of the plurality of omni-symmetrical regions for each of the one or more lenses associated with a corresponding set of lens temperature ranges.

8. A method for camera focus alignment of a lens array, comprising:
   defining a plurality of omni-symmetrical regions within each lens within the lens array;
   defining a localized set of calibration parameters for each of the plurality of omni-symmetrical regions for each lens within the lens array;
   defining a field of view of the lens array as a union of the fields of view of one or more of the plurality of omni-symmetrical regions for one or more of the lenses within the lens array;
   setting one or more focus station parameters;
   placing a camera and the lens array in the focus station;
   capturing images via the camera and lens array;
   estimating the intrinsic parameters for each of the plurality of omni-symmetrical regions for each of the one or more of the lenses within the lens array;
   estimating the extrinsic multi-camera parameters, including one or more portions thereof able to resolve different resolutions of an object being imaged, for each of the plurality of omni-symmetrical regions for each of the one or more of the lenses within the lens array;
   evaluating the results of application of the intrinsic parameters and defining one or more adjustments to be made to the parameters of the camera and lens array in the focus station; and
   sending the adjustments to the focus station.

9. The method of claim 8, further comprising:
   associating a first lens array temperature range with the localized set of calibration parameters; and
   defining a second localized set of calibration parameters for each of the plurality of omni-symmetrical regions associated with a second lens array temperature range.

10. The method of claim 9, further comprising: defining an additional plurality of localized sets of calibration parameters for each of the plurality of omni-symmetrical regions for each of the one or more lenses associated with a corresponding set of lens temperature ranges.

11. A system for calibrating a lens array, comprising:
    a focus station for receiving a camera and the lens array, the focus station further adapted to set one or more focus station parameters, initiate image capture via the camera and lens array; and
    a processor for defining a plurality of omni-symmetrical regions within each lens within the lens array, for defining a localized set of calibration parameters for each of the plurality of omni-symmetrical regions for each lens within the lens array for determining one or more portions from one or more of the lenses in the lens array that when combined provide a higher resolution image than would be available from any single lens withing the lens array, and for combining the one or more determined portions to generate a high resolution image.

12. The system of claim 11, wherein the processor further defines a field of view of each of the plurality of omni-symmetrical regions, and defines a field of view of each of the one or more lenses as the union of the fields of view of each of the plurality of omni-symmetrical regions.

13. The system of claim 12, wherein one or more localized lens parameters comprise one or more intrinsic parameters of each of the omni-symmetrical regions for each of the one or more lenses.

14. The system of claim 13, wherein the one or more localized lens parameters further comprise one or more extrinsic multi-camera parameters.

15. The system of claim 11, further comprising, upon use of the calibrated lens array to image an object:
- an imaging processor for determining whether a portion of the field of view of each of the one or more lenses corresponding to one of the particular omni-symmetrical regions imaging the object includes resolving ability sufficient for resolving the object; and
- a display for displaying to a user instructions for repositioning the lens array relative to the object when it is determined that a portion of the field of view of the lens array corresponding to the particular omni-symmetrical regions imaging the object does not have resolving ability sufficiently for resolving the object.

16. The system of claim 11, wherein the processor further:

associates a first lens array temperature range with the localized set of calibration parameters; and defines a second localized set of calibration parameters for each of the plurality of omni-symmetrical regions associated with a second lens array temperature range.

17. The system of claim 16, wherein the processor further:

defines an additional plurality of localized sets of calibration parameters for each of the plurality of omni-symmetrical regions associated with a corresponding set of lens array temperature ranges.

\* \* \* \* \*